G. M. MOWBRAY.
MANUFACTURE OF NITROGLYCERINE.
No. 76,499.          Patented Apr. 7, 1868.
*Making Nitro-Glycerine.*
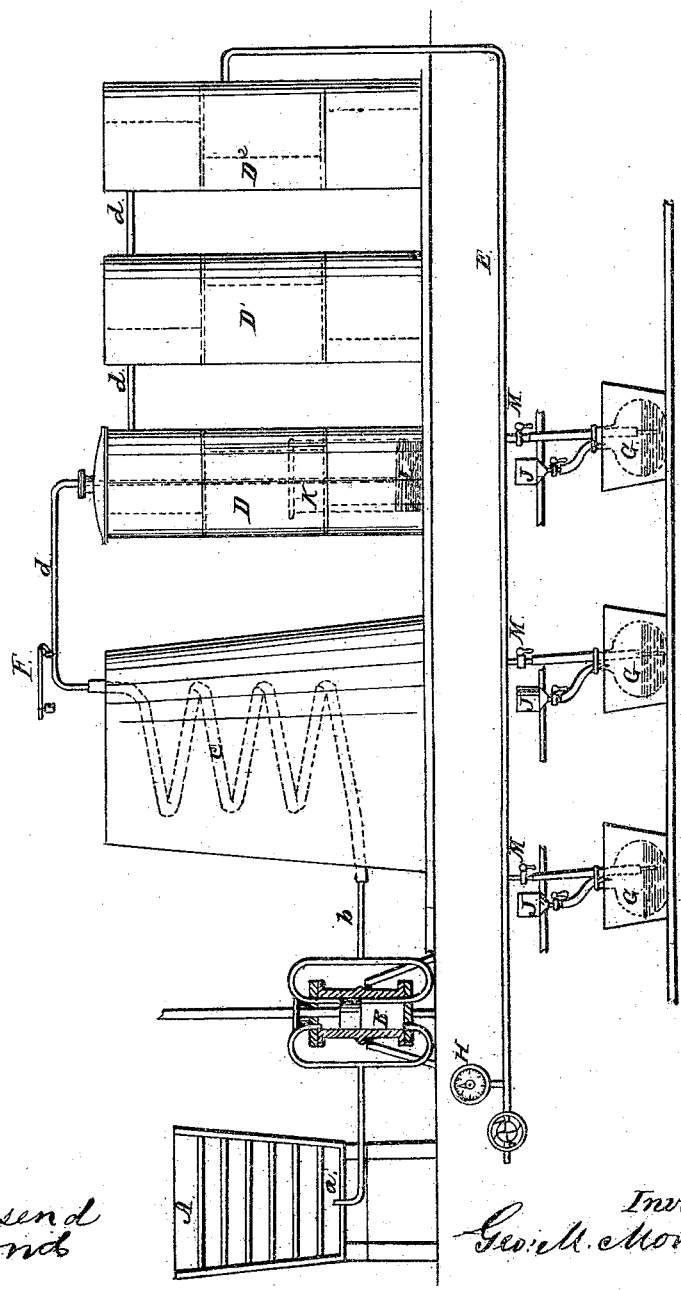
Witnesses:
Wm. A. Townsend
Austin Bond
Inventor.
Geo. M. Mowbray

UNITED STATES PATENT OFFICE.

GEORGE M. MOWBRAY, OF TITUSVILLE, PENNSYLVANIA.

IMPROVEMENT IN THE MANUFACTURE OF NITRO-GLYCERINE.

Specification forming part of Letters Patent No. 76,499, dated April 7, 1868.

*To all whom it may concern:*

Be it known that I, GEORGE M. MOWBRAY, of the city of Titusville, county of Crawford, in the State of Pennsylvania, have invented a new and Improved Mode of Manufacturing Nitro-Glycerine; and I do hereby declare that the following is a full and exact description thereof, reference being had to the accompanying drawings, and to the letters of reference marked thereon.

It is necessary to explain that there are three principal difficulties attending the manufacture of this highly-explosive compound: First, in adding glycerine to a mixture of concentrated sulphuric and nitric acids, the chemical reaction is so intense that considerable heat is evolved, and if the temperature is permitted to exceed about 60° Fahrenheit, then oxalic and glyceric acids are formed, with a proportionate deficient yield of nitro-glycerine. Second, the use of a metallic vessel for mixing, as iron, for instance, although sometimes resorted to, in lieu of glass or porcelain, because iron is a good conductor of heat, and when surrounded with ice, enables the operator to keep down the temperature; yet I have found it to contaminate the product, as shown by the yellow tinge of the nitro-glycerine made in iron vessels; it also absorbs oxygen from the product, and to that extent decomposing it, renders it a less stable compound, unfit for storage, and the miner is unable to determine to what extent decomposition has taken place. Third, it being very difficult to manufacture, on a large scale, concentrated nitric acid, free or nearly free from hyponitrous acid, (deutoxide of azote,) and if manufactured free from this impurity, as a few minutes' exposure to sunlight will give rise to its formation, and since, if hyponitrous acid exists in the mixed acids used to manufacture nitro-glycerine, the resulting product is inevitably contaminated with it, and is next to impossible to remove from it, and, if allowed to remain induces gradual decomposition, such nitro-glycerine evolving bubbles of protoxide of nitrogen, and generating nitric acid, (free,) the former gas, if the nitro-glycerine be stored in tin vessels, bursting the cans, and the free nitric acid eating into or corroding the metal, renders such a nitro-glycerine exceedingly dangerous, either for storage, transportation, or for miners' use. To manufacture, therefore, a nitro-glycerine, chemically pure, on a large scale, which may be kept for years unchanged, and stored in tin cans without corroding them, involves perfect command of temperature, the use of glass or glazed vessels of earthenware or porcelain, and especially the conversion of any hyponitrous acid, (deutoxide of azote,) either before or during the manufacture, and these results my invention effectually secures.

My invention, then, consists in introducing a current of compressed air artificially dried and cooled, during the manufacture of nitro-glycerine, into the mixture of acids and glycerine, which serves a threefold purpose: First, it enables the operator to use glass or glazed vessels, since he is not dependent on external refrigeration alone; for, as the cooled dry air is driven into the mixture which is giving out heat, it absorbs or neutralizes this heat, partly by its own cold temperature and partly by expansion, and this useful effect takes place in the very body of the mixed acids and glycerine which generate the nitro-glycerine. Second, it partially converts any hyponitrous acid (deutoxide of azote) contained in the mixed acids into nitric acid, and carries off the remainder into the atmosphere. Third, it acts mechanically, effectually agitating and mixing the ingredients while combination is taking place, and thereby saves manual labor.

The mode in which the air is deprived of moisture, cooled, and compressed, and then used to effect these results, is shown in the accompanying drawing, reference being had to the letters annexed thereunto.

A is a suitable vessel, provided with shelves, on which any inexpensive absorbent, (such as unslaked lime, plaster-of-paris, sulphuric acid in pans, &c.,) is placed, serving to dry the atmospheric air, which, descending to the open pipe $a$, is thence drawn by the air-pump B. B is an air-pump, whose suction-pipe is $a$, and eduction-pipe is $b$. C is a refrigerating-worm surrounded with ice-water, in the containing worm-tub. D D$^1$ D$^2$ are wrought-iron reservoirs for air, with their connecting-pipes $d$ $d$ $d$. In the first of these reservoirs a jar, K, is placed, partly filled with sulphuric acid L. E is the compressed-air main. F is a safety-valve. G G G are glass receivers containing the mixture of concentrated sulphuric and nitric acids. These receivers are set in a trough or troughs through which a stream of cold water is kept running. H' is a pressure-gage. J J J are vessels containing glycerine, each being commanded by a stop-cock, to control the delivery of the glycerine into the mixed acids. M M M are stop-cocks controlling the delivery of the cold compressed air into the mixture of acids and glycerine. To the pipe attached to these stop-cocks a fine glass tube (thermometer-tubing) is connected, which dips into the mixture. Motion being given to the air-pump B, air is drawn down the drying-vessel A, over the shelves containing the absorbing materials, through the inlet-pipe $a$, into the cylinder of the air-pump B, whence it is expelled, through the eduction-pipe $b$, onto the surface of the sulphuric acid L contained in the jar K inclosed in the reservoir D, (having first been cooled in passing through the worm C.) Thus cooled and dried, it passes successively into $D^1$ and $D^2$, (air-reservoirs,) thence into the main E. Being allowed to escape by partly opening the stop-cocks M M M, it issues, at the lower extremity of the glass tubes connected with said stop-cocks, into the mixture of acids and glycerine contained in the glass receivers G G G, and at the same time glycerine is allowed to drop from the vessels containing the same, and lettered J J J, at a rate so as not to raise the temperature above 60° Fahrenheit. The cold, dry, compressed air delivered into the mixture of acids and glycerine, expands as it issues from the terminal of the thermometer-tubing, and cools the mixture, meanwhile converting any free hyponitrous acid or deutoxide of azote into nitric acid, or carrying the same off, and thereby absorbs or neutralizes the heat generated by chemical action, also thoroughly agitating the ingredients, and thus saves manual labor in stirring. The result is a product of nitro-glycerine in the acids, which, by suitable washing, is incapable of spontaneous decomposition, and therefore may be safely stored or transported, or used for mining purposes.

Having thus described the nature of my invention, its principals, and mode of operation, what I claim as my invention, and desire to secure by Letters Patent, is—

The process of manufacturing nitro-glycerine by the use of compressed air, artificially dried and cooled, nitric acid, sulphuric acid, and glycerine, substantially as described.

GEO. M. MOWBRAY.

Witnesses:
WM. B. TOWNSEND,
AUSTIN BOND.